United States Patent
Klein et al.

(10) Patent No.: US 10,649,531 B2
(45) Date of Patent: May 12, 2020

(54) HAPTIC EFFECT ON A TOUCH INPUT SURFACE

(71) Applicant: Microsoft Technology Licensing, LLC, Redmond, WA (US)

(72) Inventors: Christian Klein, Duvall, WA (US); Roy Henry Berger, Jr., Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 24 days.

(21) Appl. No.: 15/886,515

(22) Filed: Feb. 1, 2018

(65) Prior Publication Data
US 2019/0235627 A1 Aug. 1, 2019

(51) Int. Cl.
| | |
|---|---|
| G06F 3/01 | (2006.01) |
| G06F 3/0354 | (2013.01) |
| G06F 3/041 | (2006.01) |
| G06F 3/0488 | (2013.01) |

(52) U.S. Cl.
CPC .............. G06F 3/016 (2013.01); G06F 3/017 (2013.01); G06F 3/03547 (2013.01); G06F 3/0416 (2013.01); G06F 3/0488 (2013.01); G06F 3/04883 (2013.01); *G06F 2203/014* (2013.01); *G06F 2203/04808* (2013.01)

(58) Field of Classification Search
CPC ...... G06F 3/016; G06F 3/017; G06F 3/03547; G06F 3/0416; G06F 3/04883
See application file for complete search history.

(56) References Cited

U.S. PATENT DOCUMENTS

| | | | | |
|---|---|---|---|---|
| 8,188,981 | B2* | 5/2012 | Shahoian | G06F 1/1616 345/156 |
| 8,279,053 | B2* | 10/2012 | Ryu | G06F 3/016 340/4.1 |
| 9,760,241 | B1* | 9/2017 | Lewbel | G06F 3/04812 |
| 2008/0150905 | A1* | 6/2008 | Grivna | G06F 3/016 345/173 |
| 2009/0085878 | A1* | 4/2009 | Heubel | G06F 3/016 345/173 |
| 2009/0167701 | A1* | 7/2009 | Ronkainen | G06F 3/016 345/173 |
| 2009/0231271 | A1* | 9/2009 | Heubel | G06F 3/016 345/156 |
| 2010/0148943 | A1* | 6/2010 | Rosenberg | A63F 13/10 340/407.1 |

(Continued)

OTHER PUBLICATIONS

International Search Report and Written Opinion Issued in PCT Application No. PCT/US19/013891, dated Jun. 17, 2019, 22 Pages.

(Continued)

*Primary Examiner* — Eric J. Bycer

(57) ABSTRACT

Techniques for haptic effect on a touch input surface are described. Generally, haptic effects are provided for different user interactions with a touch input surface, such gestures applied to a touch pad and/or a touchscreen to interact with applications, services, system-level functionalities (e.g., operating system user interfaces), and so forth. According to various implementations, haptic effects can be output based on visual and/or functional attributes of a particular device environment, and/or based on attributes of a gesture used to apply touch input.

20 Claims, 12 Drawing Sheets

(56) References Cited

U.S. PATENT DOCUMENTS

| | | | |
|---|---|---|---|
| 2011/0210834 A1* | 9/2011 | Pasquero | G06F 3/016 |
| | | | 340/407.1 |
| 2011/0210926 A1 | 9/2011 | Pasquero et al. | |
| 2011/0248916 A1* | 10/2011 | Griffin | G06F 3/016 |
| | | | 345/157 |
| 2011/0285666 A1 | 11/2011 | Poupyrev et al. | |
| 2012/0242584 A1 | 9/2012 | Tuli | |
| 2012/0268412 A1 | 10/2012 | Cruz-Hernandez et al. | |
| 2014/0085221 A1* | 3/2014 | Kim | G06F 3/016 |
| | | | 345/173 |
| 2015/0293592 A1* | 10/2015 | Cheong | G06F 3/016 |
| | | | 345/173 |
| 2017/0178470 A1 | 6/2017 | Khoshkava et al. | |

OTHER PUBLICATIONS

Nager, Chris, "Touchable Textures with CSS—Can you feel me?", Retrieved From: https://web.archive.org/web/20170408085753/http://chrisnager.com:80/touchable-textures-with-css-can-you-feel-me/, Oct. 18, 2012, 10 Pages.

Rantalainen, Mikko, "Re: Haptics CSS Extension Proposal", Retrieved From: https://lists.w3.org/Archives/Public/www-style/2010Jun/0392.html, Jun. 14, 2010, 2 Pages.

* cited by examiner

HAPTIC EFFECT ON A TOUCH INPUT SURFACE

BACKGROUND

Modern computing devices utilize a variety of different types of feedback to indicate to users that certain functionalities are available and that certain actions are occurring or about to occur. For instance, when a user hovers a cursor over a hyperlink, visual feedback can be presented that indicates that the hyperlink is selectable to navigate to a particular network location. In another example, audio feedback can be presented to indicate an incoming communication, such as a new instant message.

One particularly useful type of feedback utilizes haptic effects, which provide tactilely-perceptible feedback via various mechanisms. For instance, a touch input surface may employ a tactile device (e.g., a piezo-electric device, an electrostatic device, and so forth) to provide a localized haptic effect when a user presses a virtual button displayed on the touchscreen. Such haptic feedback represents a tactile reinforcement that the user has successfully selected the virtual button, and may be combined with other types of feedback (e.g., visual and audio feedback) to increase the perceptibility of certain actions and functionalities. While haptic effects can be leveraged in a variety of scenarios, haptics can be difficult to comprehensively incorporate across different applications and services that may not have the ability to invoke haptic mechanisms, and/or that may be unaware of different attributes of a computing environment in which haptic effects are employed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for haptic effect on a touch input surface are described. Generally, haptic effects are provided for different user interactions with a touch input surface, such gestures applied to a touch pad and/or a touchscreen to interact with applications, services, system-level functionalities (e.g., operating system user interfaces), and so forth. According to various implementations, haptic effects can be output based on visual and/or functional attributes of a particular device environment, and/or based on attributes of a gesture used to apply touch input.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
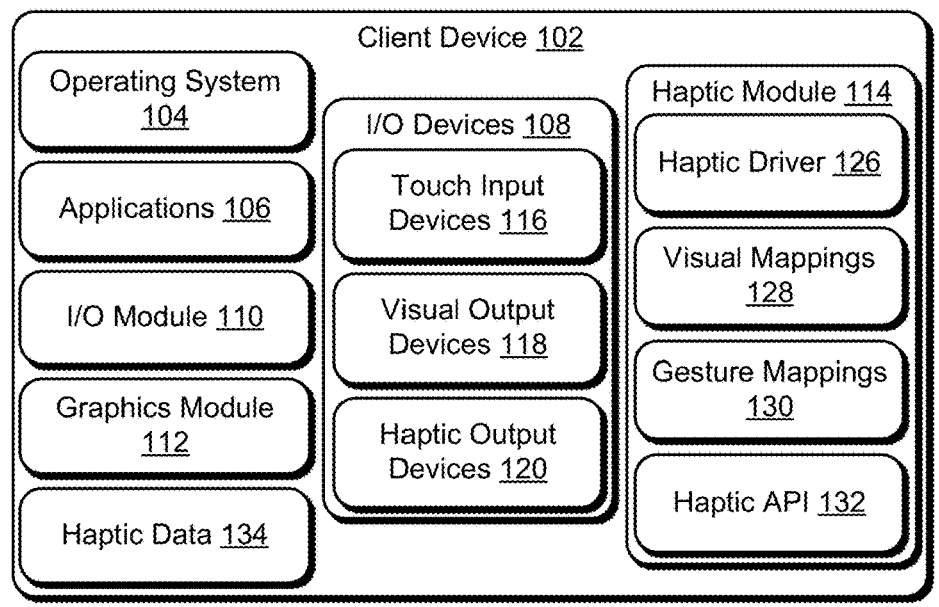
FIG. 1 is an illustration of an environment in an example implementation that is operable to employ techniques discussed herein.
Figure 1:
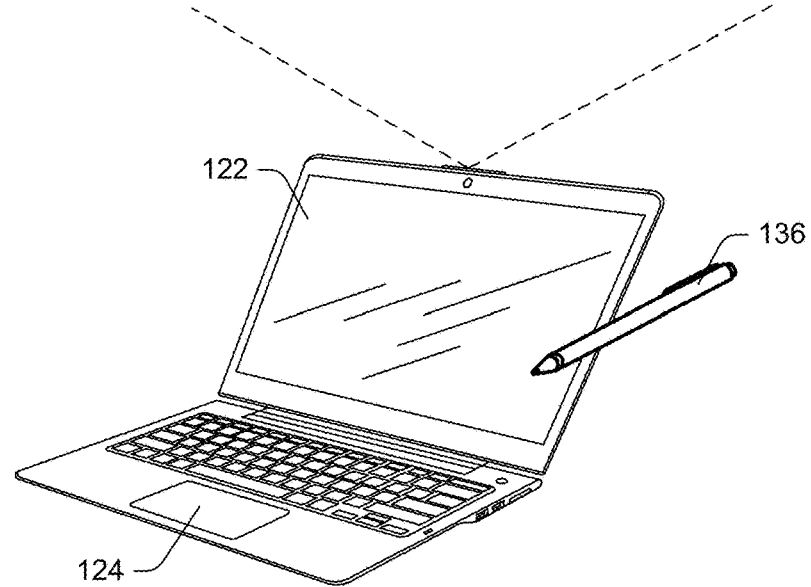

Techniques for haptic effect on a touch input surface are described. Generally, haptic effects are provided for different user interactions with a touch input surface, such gestures applied to a touch pad and/or a touchscreen to interact with applications, services, and so forth. According to various implementations, haptic effects can be output based on visual and/or functional attributes of a particular device environment, and/or based on attributes of a gesture used to apply touch input.

For instance, consider a scenario where a user applies touch input to a touchpad (e.g., a trackpad) to manipulate a cursor displayed on a separate display device. Further, the display device displays a visual environment that includes different visual elements, such as graphical user interfaces (GUIs), system controls, visual notifications, and so forth. As the cursor is manipulated in proximity to the different visual elements, different haptic effects are output on the touchpad to reflect visual and/or functional attributes of the visual elements. For instance, a haptic effect for a particular visual element can be determined based on its visual attributes, e.g., size, color, shading, and so forth. Alternatively or additionally, the haptic effect can be determined based on a functionality associated with the particular visual element, such as an action that can be performed in response to interaction with the particular visual element. Accordingly, a haptic effect output in response to a particular visual element can provide a tactile indication of a visual and/or functional attribute of the visual element.

While this scenario is described with reference to touch interaction with a separate touchpad, the scenario may similarly be applied to touch input to the display device itself. For instance, where the touch input represents touch interaction with a visual element displayed on a touchscreen, a haptic effect for the visual element can be output on the touchscreen.

In another example scenario, a haptic effect can be output for a gesture and based on an attribute of the gesture. For instance, consider that a user applies a multi-touch gesture to a touch input surface and using multiple fingers. The multi-touch gesture, for instance, is associated with a particular action, such as a visual zoom, a content navigation, a page scroll, and so forth. According to techniques described herein, a haptic effect can be generated for the multi-touch gesture and based on an attribute of the gesture, such as a number of fingers used to apply the gesture, a direction of the gesture relative to the touch input surface, a speed of the gesture, an action associated with the gesture, a progress status of the gesture (e.g., how close the gesture is to completion), and so forth. Thus, the haptic effect is output on the touch input surface to provide a tactile indication of an attribute of the gesture. In at least one implementation, different haptic effects can be output to different objects (e.g., fingers) involved in a multi-touch gesture.

Accordingly, techniques described herein enable haptic effects to be customized to a variety of different visual and functional scenarios. For instance, typical legacy haptic technologies simply provide a uniform haptic response to input, and thus cannot provide tactile reinforcement of visual and/or functional differences between visual elements in a visual environment, and/or functional differences between different types of gestures. Not only does this provide an enhanced used experience, but also represents an important advance in the technological areas of haptic feedback and user accessibility. For instance, techniques for haptic effect on a touch input surface described herein can be employed for users with a visual impairment, such as to provide a tactile indication of visual and/or functional differences between visual elements in a visual environment, and/or functional differences between different types of gestures. Further, by providing preconfigured haptic effects for different visual and functional elements, computing system resources and network resources are conserved by reducing processing operations and communications required to determine an appropriate haptic effect in a particular scenario.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for haptic effect on a touch input surface described herein. The environment 100 includes a client device 102, which may be configured in a variety of ways, such as a traditional computer (e.g., a desktop personal computer, laptop computer, and so on), a mobile device (e.g., a smartphone, a tablet device, and so on), an entertainment appliance, a wearable device, a game console, and so forth.

The client device 102 includes a variety of different functionalities that enable various activities and tasks to be performed. For instance, the client device 102 includes an operating system 104, applications 106, input/output ("I/O") devices 108, an input/output ("I/O") module 110, a graphics module 112, and a haptic module 114. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 represent functionalities for performing different tasks via the client device 102. Examples of the applications 106 include a word processing application, a spreadsheet application, a web browser, a gaming application, a communication application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The I/O devices 108 are representative of different functionalities for receiving input to the client device 102 and/or for providing output from the client device 102. Particular instances of the I/O devices 108, for example, represent a dedicated input device, a dedicated output device, or a device that both receives input and provides output. The I/O devices 108 include touch input devices 116, visual output devices 118, and haptic output devices 120. The touch input devices 116 are representative of functionality for receiving touch input to the client device 102. Generally, touch input can include direct contact by a user such as using a finger and/or combination of fingers. Touch input can also include input using a touch input device, such as a stylus or a digital pen ("pen").

The visual output devices 118 are representative of functionality for visual output for the client device 102. The visual output devices 118 can include functionality for direct visual output by the client device 102 (e.g., a display screen), and/or functionality for communicating visual data from the client device 102 to a different device to be displayed. For instance, graphics generated by the client device 102 can be communicated via a wireless and/or wired connection to a different device (e.g., a remote display screen or other client device) for display by the different device.

The haptic output devices 120 are representative of devices that are configured to provide haptic output. The haptic output devices 120, for instance, are configured to provide a haptic response to touch input which is tactilely-perceptible. Generally, the haptic output devices 120 may utilize a variety of different haptic-generating mechanisms to generate a haptic response, such as electrostatic force, a motor, magnets, linear resonant actuators (LRAs) (magnetic and/or piezo based), piezo-electric structures, and so forth.

Specific examples of the I/O devices 108 include a display device 122 and a touchpad 124. The display device 122 is configured to provide visual output for the client device 102. In at least one implementation, the display device 122 is configured as a touchscreen device. In a touchscreen implementation, for example, the display device 122 is not only configured to provide visual output, but can also receive touch input. Thus, in a touchscreen implementation, the display device 122 represents an instance of a touch input device 116 and a visual output device 118. The display device 122 may also be configured to provide haptic output, such as in response to touch input. For instance, the display device 122 can be implemented as an instance of a touch input device 116, a visual output device 118, and a haptic output device 120. Alternatively to the display device 122 itself generating haptic output, a separate instance of a haptic output device 120 can be positioned to generate haptic effects that are perceptible on the surface of the display device 122.

The touchpad 124 is representative of functionality for receiving touch input to the client device 102, such as for navigating a cursor or other visual indicator across the display device 122, and for interacting with visual elements displayed on the display device 122. In at least one implementation, the touchpad 124 can not only receive touch input for the client device 102, but can provide various types of haptic output. Thus, in such an implementation, the touchpad 124 represents an instance of a touch input device 116 and a haptic output device 120.

Continuing with the discussion of the client device 102, the I/O module 110 represents functionality processing and directing input and output relating to the I/O devices 108. The I/O module 110, for instance, can detect input to the touch input devices 116, and can enable the input to be processed and directed to an appropriate functionality, such as the applications 106, the operating system 104, and/or the haptic module 114.

The graphics module 112 represents functionality to enable graphics to be displayed via the client device 102, such as on the display device 122 and/or a remote display device. Example implementations of the graphics module 112 include a graphics driver, a display driver, a graphics processing unit (GPU), a rendering engine, and/or combinations thereof.

The haptic module 114 represents functionality for enabling the client device 102 to provide various types of haptic output. For instance, the haptic module 114 represents hardware and logic for enabling the haptic output devices 120 to output various types of haptic effects. The haptic module 114, for example, includes a haptic driver 126, visual mappings 128, gesture mappings 130, and a haptic application programming interface (API) 132. The haptic driver 126 represents functionality for enabling other functionalities of the client device 102, such as the operating system 104 and/or the applications 106, to invoke the haptic output devices 120 to generate haptic effects.

The visual mappings 128 represent data that correlates various types of visual elements to corresponding haptic effects. For instance, and as further described below, visual elements that are generated by the client device 102 can be associated with different haptic effects that are based on attributes of the visual elements, such as visual element type, size, shading, position, functionality, and so forth.

The gesture mappings 130 represent data that maps different gestures to different respective types of haptic effects. For instance, different gesture attributes can cause different respective types of haptic effects to be generated. As described herein, a "gesture" includes a touch gesture to an input surface, such as to the touchpad 124 and/or the display device 122.

Generally, the haptic API 132 and the haptic driver 126 represent functionalities to enable various other functionalities to invoke the haptic output devices 120. For instance, the operating system 104 and the applications 106 can call the haptic API 132 to request that a particular haptic output device 120 generate haptic effects. The haptic API 132 then interfaces with the haptic driver 126, which in turn interfaces with the haptic output devices 120 to cause the haptic output devices 120 to generate haptic effects. Example interactions between the various entities included in the environment 100 are described below.

In at least some implementations, the haptic module 114 may be implemented as part of system resources of the client device 102, such as part of the operating system 104. Alternatively or additionally, the haptic module 114 can be implemented as part of the haptic output devices 120, such as in firmware of the haptic output devices 120.

While certain implementations are discussed herein from the perspective of haptic output devices 120 that are integrated into the client device 102, it is to be appreciated that techniques described herein can alternatively or additionally be applied using external (e.g., peripheral) haptic output devices. For examples, an instance of a haptic output device 120 can be implemented as a separate, external device that is connectable to the client device 102 via a wired and/or wireless connection, such as a peripheral touchpad or display device. In a scenario that utilizes an external haptic output device 120, the haptic module 114 may reside on the client device 102, and/or may represent onboard functionality that is implemented on the external haptic output device 120.

The client device 102 further includes haptic data 134, which represents information about whether a particular application 106 specifies custom haptic effects that deviate from default haptic effects, e.g., from haptic effects specified by the visual mappings 128 and/or the gesture mappings 130. In such a scenario, the haptic module 114 can apply, for the particular application 106, the custom haptic effect(s) instead of the default haptic effects. Generally, the haptic data 134 may be implemented as part of the haptic module 114, as part of the operating system 104, and/or as a standalone set of haptic data that is accessible by different functionalities of the client device 102.

Further illustrated as part of the environment 100 is a pen 136, which is representative of an input device that can provide input to the client device 102. The pen 136, for instance, can be leveraged to apply digital ink to the display device 122. The pen 136 can also be used for other purposes, such as selection and manipulation of visual objects displayed on the display device 122.

According to various implementations, haptic effects can be generated based on interaction between the pen 136 and the client device 102. For instance, when the pen 136 is used to provide input to the display device 122, a haptic effect can be generated based on a context of the input. The haptic effect, for example, can be generated by a haptic output device 120. Alternatively or additionally, the pen 136 is haptic-enabled such that the pen 136 can generate haptic effects. For instance, in a haptic-enabled implementation, the pen 136 includes various internal components that can generate haptic effects in response to interaction between the pen 136 and the client device 102. The pen 136, for example, can provide input to the display device 122, and based on a context of the input can generate a haptic response. The various implementations and scenarios discussed below, for example, may apply to haptic effects generated by various haptic-enabled devices, such as the touchpad 124, the display device 122, and/or the pen 136.

Having described an example environment in which the techniques described herein may operate, consider now a discussion of an example implementation scenario for haptic effect on a touch input surface in accordance with one or more embodiments.

Example Implementation Scenarios

The following section describes some example implementation scenarios for haptic effect on a touch input surface in accordance with one or more implementations. The implementation scenarios may be implemented in the environment 100 discussed above, and/or any other suitable environment.

Figure 2:
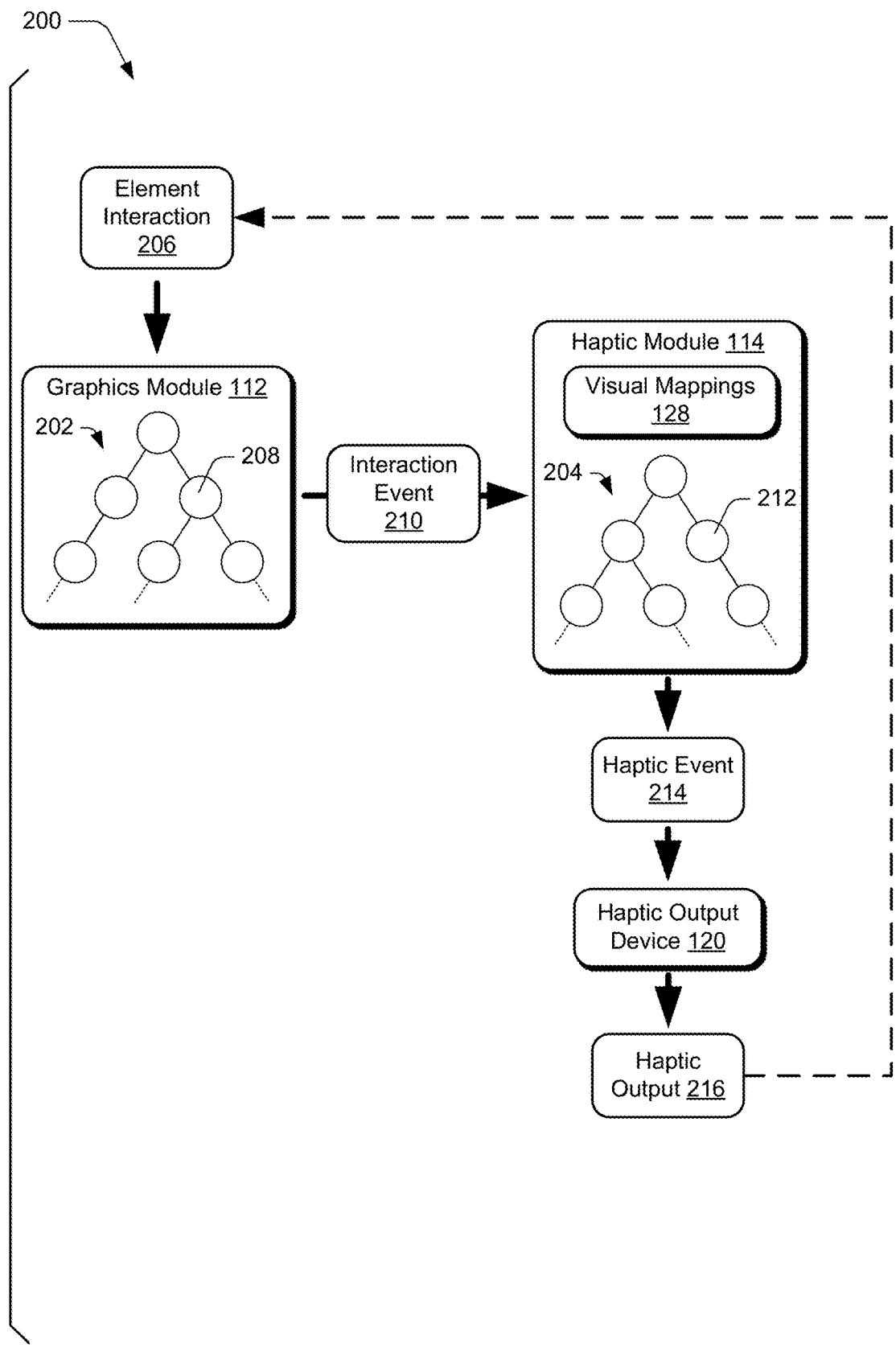
FIG. 2 illustrates an example implementation scenario for generating a haptic effect using a visual tree and a haptic tree.

FIG. 2 depicts an example implementation scenario 200 for generating a haptic effect using a visual tree and a haptic tree. The scenario 200 includes the graphics module 112 and the haptic module 114, introduced above. The graphics module 112 maintains a visual tree 202 which the graphics module 112 can utilize to render a graphic object. The visual tree 202, for instance, is representative of a data structure that is populated with nodes that specify different visual attributes of a graphic object, such as location, size, color, opacity, and so forth, of visual elements of the graphic object. Examples of a graphic object include a graphical user interface (GUI) for an application 106, a GUI of the operating system 104 (e.g., for a system interface), an animation, an icon or other selectable control, and so forth.

The haptic module 114 maintains a haptic tree 204, which is representative of a data structure that the haptic module 114 can utilize to generate haptic effects. The haptic tree 204, for instance, is populated with nodes that specify different types and attributes of haptic effects, such as intensity (e.g., amplitude), duration, frequency (e.g., in Hertz), and so forth, for different haptic effects.

According to implementations for haptic effect on a touch input surface described herein, the visual mappings 128 can be utilized to generate a haptic effect by mapping the visual tree 202 to the haptic tree 204. For instance, in the scenario 200 an element interaction 206 occurs indicating a user interaction with a visual element 208 of the visual tree 202. The element interaction 206 generally represents an instance of various types of user interactions, such as a user manipulating a cursor over the visual element 208, a user selection of the visual element 208, a user manipulation of the visual element 208 (e.g., dragging, resizing, zooming, and so forth), and so on.

Based on the element interaction 206, the graphics module 112 generates an interaction event 210 which specifies attributes of the element interaction 206. Attributes that can be specified by the interaction event 210 include attributes of the visual element 208, such as an identifier for the visual element 208 and/or an element type for the visual element 208. The interaction event 210 may also include physical attributes of the element interaction 206, such as a velocity of the interaction, a pressure of the interaction (e.g., a touch force applied to the touchpad 124 or the display device 122), a proximity of the element interaction 206 to the visual element 208, and so forth.

In at least one implementation, the graphics module 112 and/or the operating system 104 communicates the interaction event 210 to the haptic module 114, such as via the haptic API 132. Accordingly, the haptic module 114 applies the interaction event 210 to the visual mappings 128 to map the element interaction 206 to a haptic effect 212 specified by the haptic tree 204. The visual mappings 128a, for instance, specify that the haptic effect 212 corresponds to the visual element 208. The haptic module 114 then generates a haptic event 214 that specifies various parameters to be used for generating an output based on the element interaction 206 and the haptic effect 212. The haptic event 214, for instance, specifies a duration, an intensity, a cycling frequency, a waveform, an effect type, and so forth, to be applied for outputting the haptic effect 212. Accordingly, a haptic output device 120 generates a haptic output 216 based on attributes specified by the haptic event 214.

The haptic output 216, for instance, can be generated by the touchpad 124 and/or the display device 122. In a scenario where the element interaction 206 occurs via user interaction with the touchpad 124, the haptic output 216 is generated via the touchpad 124. However, in a scenario where the element interaction occurs as touch input to the display device 122 (e.g., via a user's finger or the pen 136), the haptic output 216 is generated via the display device 122. As yet another implementation, the haptic output 216 can be generated by the pen 136 if the pen 136 is a haptic-enabled device, such as described above.

Notice that the scenario 200 includes a return arrow from the haptic output 216 to the element interaction 206. Generally, this indicates that the scenario 200 can be performed iteratively to provide a varying haptic output 216 as the element interaction 206 occurs. For instance, the haptic output 216 can be modulated as the element interaction 206 moves over different parts of the visual element 208.

Accordingly, the scenario 200 illustrates that techniques for haptic effect on a touch input surface enable different visual elements to be mapped to different haptic effects to provide a haptic experience that provides customizable haptic output based on types and attributes of visual elements.

Figure 3:
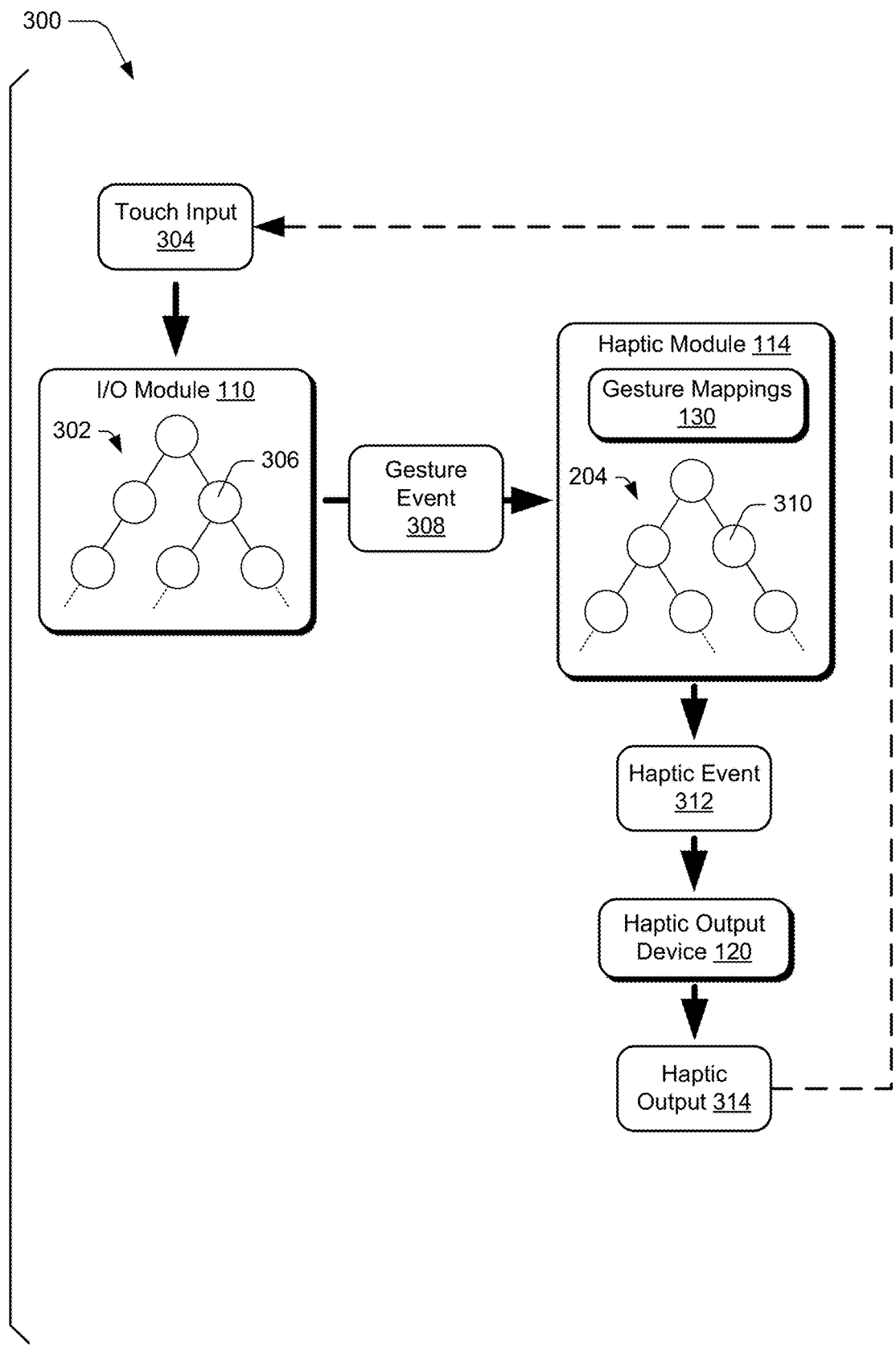
FIG. 3 depicts an example implementation scenario for generating a haptic effect based on attributes of a gesture.

FIG. 3 depicts an example implementation scenario 300 for generating a haptic effect based on attributes of a gesture. The scenario 300 includes the I/O module 110 and the haptic module 114, introduced above. The I/O module 110 maintains a gesture tree 302 and the haptic module 114 includes the haptic tree 204, introduced above.

Generally, the gesture tree 302 is representative of a data structure that the I/O module 110 can utilize to interpret different touch gestures. The gesture tree 302, for instance, is populated with nodes the specify different types of gestures and how the different types of gestures are to be interpreted. Example attributes of gestures that are specified by the gesture tree 302 include a number of objects involved in the gesture, a direction of the gesture (e.g., relative to the touchpad 124 and/or the display device 122), a velocity of the gesture, a distance of movement involved in the gesture, progress information for the gesture (e.g., where the gesture begins and ends), and so forth. When a gesture involves multiple fingers, attributes of the gesture can include a relative direction of movement of individual fingers involved in the gesture relative to one another. While gestures are discussed herein in the context of finger gestures, it is to be appreciated that implementations for haptic effect on a touch input surface can recognize and utilize gestures that involve input objects additionally or alternatively to a finger, such as a palm of a hand, a fist, a stylus, a pen, and so forth.

In the scenario 300, the I/O module 110 detects a touch input 304 received via user input to a touch input device 116. The I/O module 110 determines that based on attributes of the touch input 304, the touch input 304 corresponds to a gesture 306 identified on the gesture tree 302. Accordingly, the I/O module 110 generates a gesture event 308, which identifies the gesture 306. The gesture event 308, for instance, identifies the gesture 306 using a discrete identifier which can be used to distinguish the gesture 306 from other gestures. Alternatively or additionally, the gesture event 308 can include attributes of the gesture, examples of which are described above.

In at least one implementation, the I/O module 110 and/or the operating system 104 communicates the gesture event 308 to the haptic module 114, such as via the haptic API 132. Accordingly, the haptic module 114 applies the gesture event 308 to the gesture mappings 130 to map the gesture 306 to a haptic effect 310 specified by the haptic tree 204. The gesture mappings 130, for instance, specify that the haptic effect 310 corresponds to the gesture 306. The haptic module 114 then generates a haptic event 312 that specifies various parameters to be used for generating an output based on the gesture 306 and the haptic effect 310. The haptic event 312, for instance, specifies a duration, an intensity, a cycling frequency, and so forth, to be applied for outputting the haptic effect 310. Accordingly, a haptic output device 120 generates a haptic output 314 based on attributes specified by the haptic event 312. The haptic output 314, for instance, can be output via one or more of the haptic output devices 120, such as the touchpad 124, the display device 122, and/or the pen 136.

As mentioned above, the gesture tree 302 can include information about a progress of movement of a gesture, such as where the gesture starts relative to where the gesture ends, and how the gesture changes (e.g., in direction and/or velocity) between the beginning and the end of the gesture. Different gestures, for instance, include different respective movements and/or combinations of movements of an input object and/or input objects on a touch surface. For example, a particular gesture can be defined with respect to its endpoint relative to its start point, and particular movement (s) that occur between the start point and the endpoint. In such an implementation, progress information from the gesture tree 302 can be mapped to different haptic effects on the haptic tree 302 to provide varying haptic effects over the course of the gesture. By varying haptic effects that are applied during a gesture, different gesture-related information can be communicated via haptics, such as how far along the gesture is (e.g., from its beginning), how close to completion the gesture is, that a current direction of movement of an input object will abort or alter an output of the gesture, and so forth. In at least some implementations, providing varying haptic effects over the course of a particular gesture is implemented by mapping different progress points for the gesture identified by the gesture tree 302 to different corresponding haptic effects identified by the haptic tree 204.

For instance, notice that the scenario 300 includes a return arrow from the haptic output 314 to the touch input 304. According to various implementations, this indicates that the scenario 300 can be applied iteratively over the progress of a gesture indicated by movement of the touch input 304 over a touch input surface. As the touch input 304 is applied to define a particular gesture, the I/O module 110 generates different gesture events 308 that identify the relative progress of the gesture. Accordingly, the haptic module 114 generates different haptic events 312 that specify different haptic attributes by mapping progress information from the gesture tree 302 to different respective haptic effects specified by the haptic tree 204. Thus, the haptic output device 120 applies the varying haptic events 312 to vary the haptic output 314 over the course of the gesture.

Accordingly, the scenario 300 illustrates that techniques for haptic effect on a touch input surface enable different gestures and/or progress information for a particular gesture to be mapped to different haptic effects to provide a haptic experience that provides customizable haptic output based on types and attributes of gestures.

Figure 4:
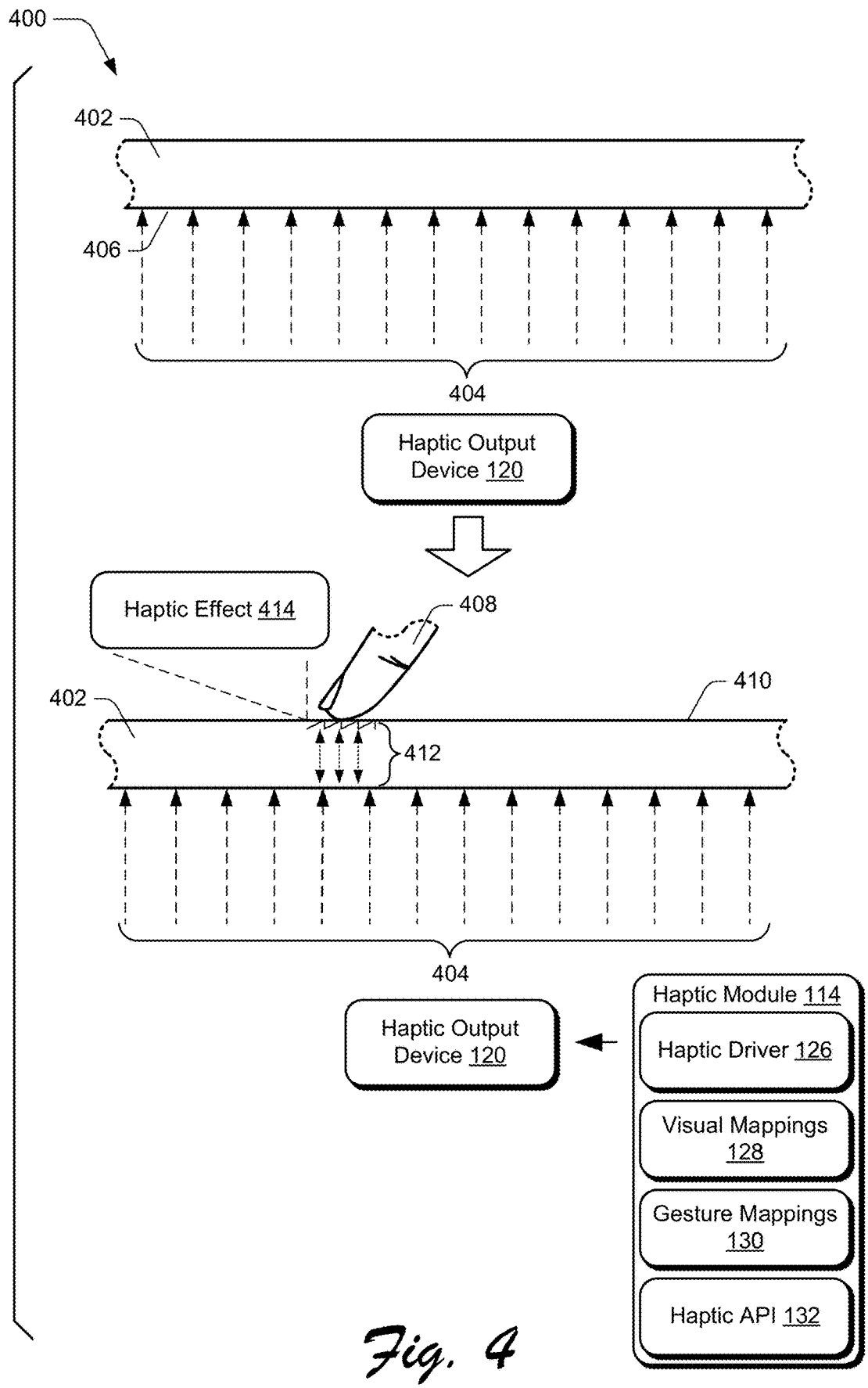
FIG. 4 depicts an example implementation scenario for generating a haptic effect utilizing an attractive force.

FIG. 4 depicts a scenario 400 which includes example input surface 402, which represents a surface of one or more of the touch input devices 116 and the haptic output devices 120. The input surface 402, for instance, represents a surface of the touchpad 124 and/or the display device 122. In the scenario 400, a haptic output device 120 generates a voltage 404 that is applied to the input surface 402, such as to an underside 406 of the input surface 402.

Proceeding to the lower portion of the scenario 400, a user places their fingertip 408 in contact with a top surface 410 of the input surface 402. Accordingly, an electrostatic attractive force 412 is created between the voltage 404 and the fingertip 408 across the input surface 402. The attractive force 412, for instance, draws the fingertip 408 into contact with the input surface 402. By increasing or decreasing the voltage 404, a strength of the attractive force 412 can be increased or decreased, respectively. Further, by increasing or decreasing (also referred to herein as "modulating") the attractive force 412, a resistance to sliding of the fingertip 408 across the input surface 402 can be increased or decreased, respectively, to generate a haptic effect 414. This resistance to sliding of the fingertip 408 (and/or other input object) simulates frictional force on the input surface 402, which can be manipulated by modulating the attractive force 412 to generate various haptic effects discussed herein. While implementations are discussed herein with reference to generating haptic effects using electrostatic force, this is not to be construed as limiting, and a variety of different haptic technologies may be utilized, examples of which are described above.

As further described below, the haptic module 114 can determine attributes of the haptic effect 414, such as based on the visual mappings 128, the gesture mappings 130, and so forth.

Figure 5:
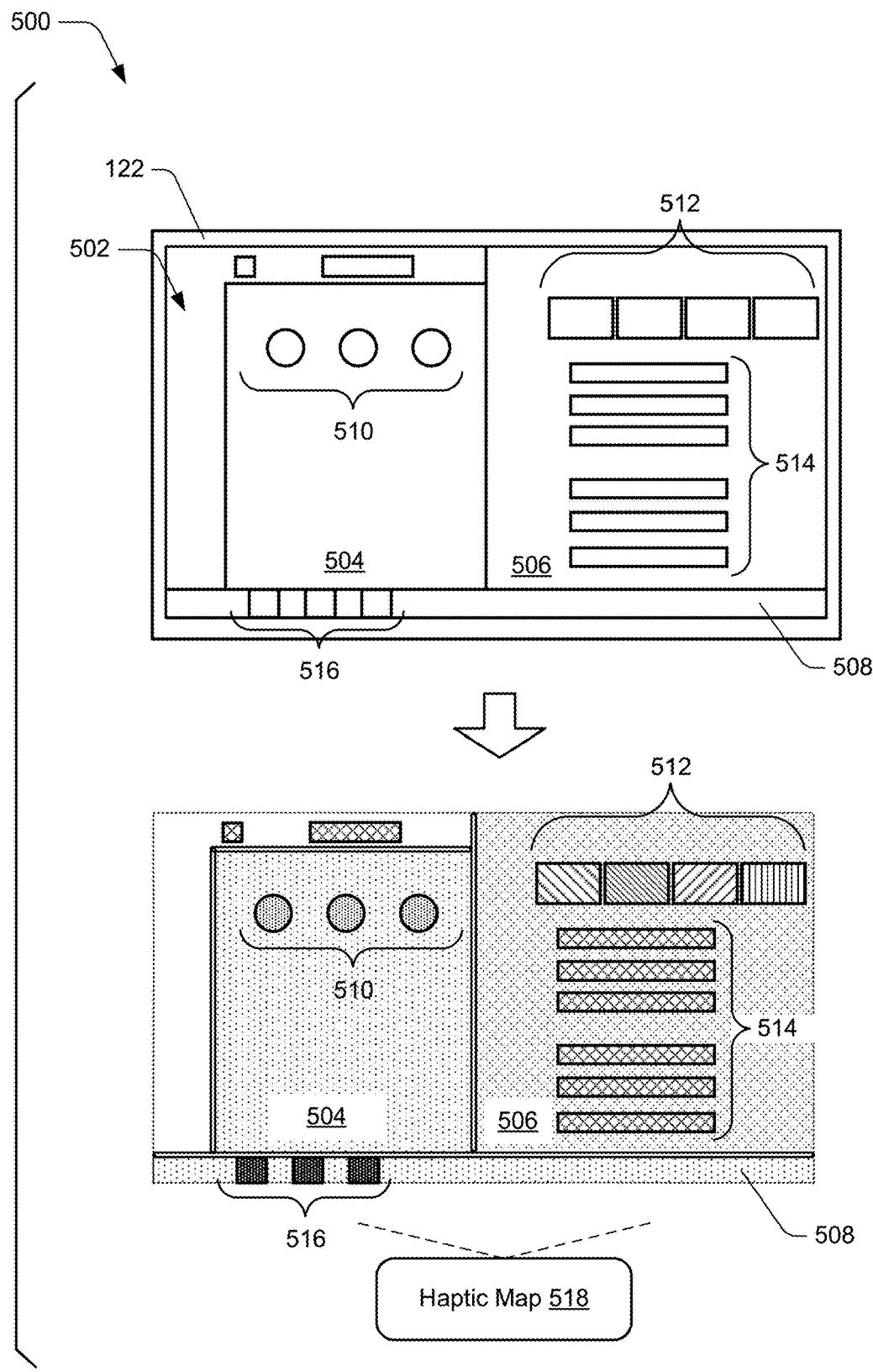
FIG. 5 depicts an implementation scenario for a haptic experience in a visual environment.

FIG. 5 depicts an implementation scenario 500 for a haptic experience in a visual environment. The upper portion of the scenario 500 includes the display device 122 with a visual environment 502 displayed. The visual environment 502 includes various visual objects and visual elements. Among the visual objects are a GUI 504, a GUI 506, and a system interface 508. The GUIs 504, 506 can be generated by different functionalities, such as different instances of the applications 106, the operating system 104, and so forth. The system interface 508 is generated by the operating system 104 and represents an interface for presenting and accessing system information. In one implementation, the system interface 508 represents a taskbar for the operating system 104.

The visual objects include different visual elements that make up the respective visual objects. The GUI 504, for instance, includes visual elements 510, and the GUI 506 includes visual elements 512 and visual elements 514. Further, the system interface 508 includes visual elements 516.

The lower portion of the scenario 500 depicts a haptic map 518 of the visual environment 502. Generally, the haptic map 518 specifies different haptic effects that can be applied in response to interaction with the different visual objects and visual elements of the visual environment 502. In at least one implementation, the visual environment 502 is generated using the visual tree 202 and the haptic map 518 is a visual representation of the haptic tree 204.

Notice that in the haptic map 518, the different visual objects and visual elements are filled with different respective visual fill patterns. The different fill patterns generally represent different respective haptic effects, such as differing amounts of friction that can be generated in response to interaction with the different respective visual objects and visual elements. Alternatively or additionally, the different fill patterns represent different respective haptic effects that simulate different physical surface textures, such as rough, smooth, wet, dry, and so forth. Further, the borders of the visual objects are exaggerated in comparison with their visual appearance in the visual environment 502. Generally, this indicates that a haptic effects occurs in response to interaction with a border.

Further to the scenario 500, notice that the GUI 504 has a different fill pattern than the GUI 506. This indicates that a different haptic effect is generated during interaction with the GUI 504 than during interaction with the GUI 506. For instance, less frictional force is generated during interaction with the GUI 504 than during interaction with the GUI 506. Generally, this provides a haptic reinforcement that a user is interacting with either the GUI 504 or the GUI 506.

In the haptic map 518, each of the visual elements 512 has a different associated haptic effect, as illustrated by their different respective fill patterns. According to one or more implementations, this indicates that each of the visual elements 512 is associated with a different associated action. Each of the visual elements 512, for instance, is selectable to invoke a different respective action. Applying different haptic effects for each of the visual elements 512 provides a haptic reinforcement of the different actions that can be invoked via the different visual elements 512. Examples of these different actions include file operations (e.g., moving a file, copying a file, deleting a file, and so forth), content navigation (e.g., retrieving content, navigating web content, sharing content, and so forth), communication-related actions (e.g., email and/or instance message related actions), and so on.

According to various implementations, the haptic map 518 is reconfigured in response to a change to the visual environment 502. For instance, if a user moves the GUI 504 to a different position on the display device 122, the haptic map 518 will be reconfigured to reflect the new position of the GUI 504 to provide a haptic experience consistent with the altered arrangement of the visual environment 502.

Figure 6:
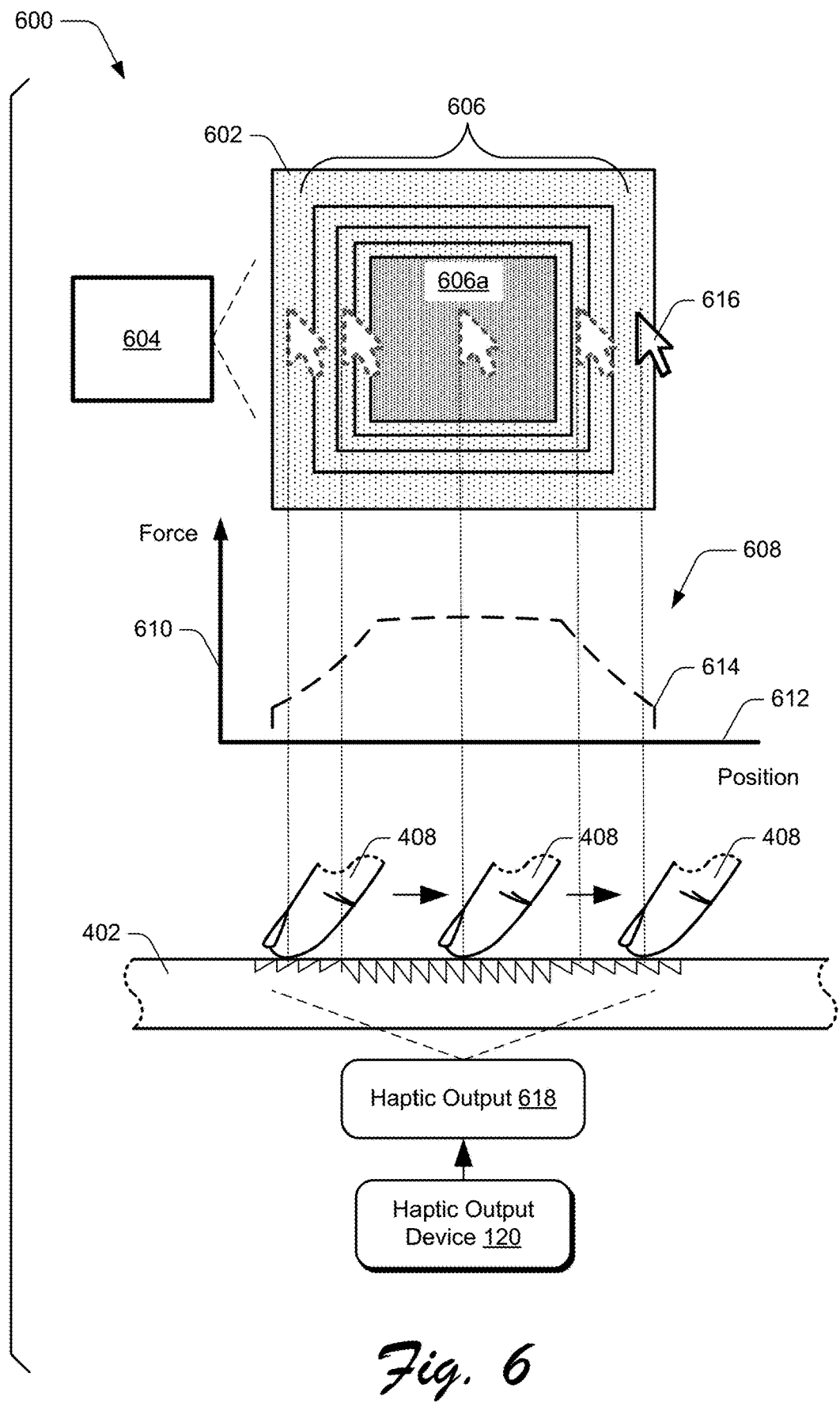
FIG. 6 depicts an implementation scenario showing a varying haptic output for a visual element.

FIG. 6 depicts an implementation scenario 600 showing a varying haptic output for a visual element. The scenario 600 includes a haptic profile 602 for a visual element 604. The visual element 604, for instance, represents one of the visual elements introduced in the scenario 500.

The haptic profile 602 indicates haptic attributes for the visual element 604, i.e., an indication of how haptic effects are applied in response to an interaction with the visual element 604. In this example, the haptic profile 602 includes several nested haptic zones 606 illustrated by the nested rectangles. Each haptic zone 606 has a respective haptic response that differs from the other haptic zones.

The haptic response demonstrated by each of the haptic zones 606 is illustrated using a haptic graph 608, which includes a force axis 610, a position axis 612, and a force curve 614. The force axis 610 indicates an amount of attractive force. In at least one implementation, the attractive force indicated by the force axis 610 is characterized as electrostatic force, such as characterized via Coulomb's law. The position axis 612 indicates a position of an input object relative to the visual element 604. The force curve 614 indicates an amount of attractive force generated between an input object and an input surface.

In this particular example, the input surface 402 represents a surface of the touchpad 124, and the fingertip 408 is moved across the input surface 402 to manipulate a cursor 616 across the surface of the display device 122. Thus, in this implementation the position axis 612 indicates a position of the cursor 616 relative to the visual element 604. Further, the force curve 614 indicates an amount of attractive force generated between the fingertip 408 and the input surface 402 as the cursor 616 is manipulated across the visual element 604.

Further to the scenario 600, as the fingertip 408 moves across the input surface 402 to manipulate the cursor 616 across the visual element 604, the haptic output device 120 generates haptic output 618 on the input surface 402 and according to the haptic profile 602. As indicated by the force curve 614, as the cursor 616 is moved left to right between different haptic zones 606, an amount of attractive force generated on the input surface 402 increases until the cursor 616 reaches a center haptic zone 606a. As the cursor 616 continues to be moved left to right, the cursor 616 transitions from the center haptic zone 606a to the outer haptic zones 606 and thus a corresponding decrease in the attractive force applied to the input surface 402 occurs.

This variation in attractive force across the visual element 604 causes the haptic output 618 to provide variable friction to corresponding movement of the fingertip 408 across the input surface 402. For instance, the friction increases as the cursor 616 is moved from left to right until the cursor 616 reaches the center haptic zone 606a, at which point a maximum friction is experienced. When the cursor 616 is further moved out of the center haptic zone 606a and into the other haptic zones 606, the friction experienced at the fingertip 408 decreases until the cursor exits the visual element 604.

Thus, the scenario 600 illustrates that haptic effects can be utilized to provide a tactile indication of attributes of a visual element. For instance, the haptic profile 602 of the visual element 604 provides an indication of the location, size, and geometry of the visual element 604. While the scenario 600 is depicted with reference to manipulating the cursor 616 via input to the touchpad 124, the scenario can also apply to input via other types of input objects. For instance, the cursor manipulation described above can occur via input via the pen 136 on the touchpad 124, and thus the haptic output 618 can affect frictional resistance to movement of the pen 136 across the touchpad 124.

Additionally, the scenario 600 can be applied to direct input to the display device 122. For example, the movement of the cursor 616 across the visual element 604 can represent movement of an input object (e.g., the fingertip 408, the pen 136, and so forth) across the surface of the display device 122. Thus, the haptic output 618 can be output on the surface of the display device 122 according to the haptic profile 602.

Figure 7:
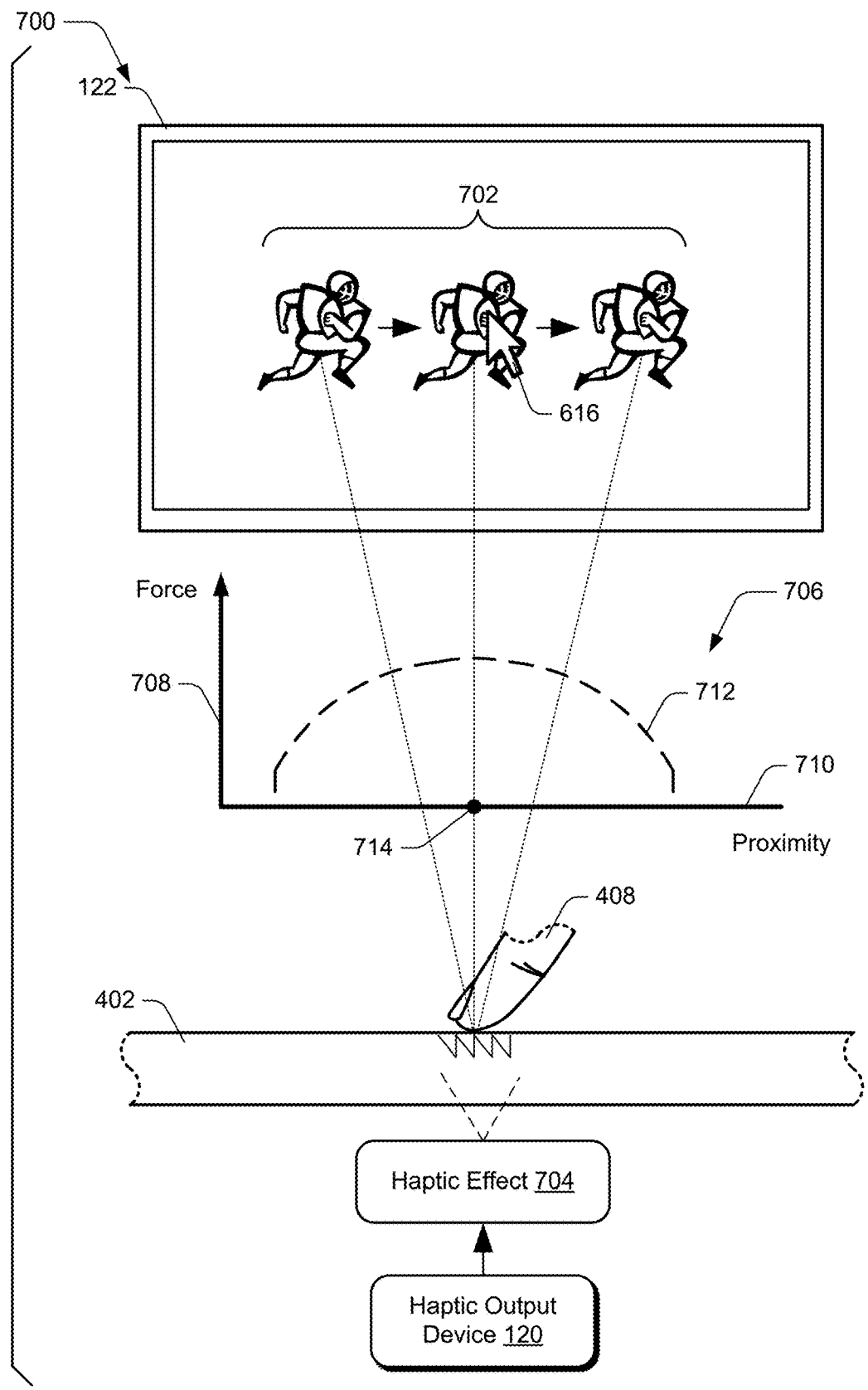
FIG. 7 depicts an implementation scenario for haptic effects for an animation.

FIG. 7 depicts an implementation scenario 700 for haptic effects for an animation. The scenario 700 includes an animation 702 that moves across the display device 122. The animation 702, for instance, is generated by an application 106 or the operating system 104. The scenario 700 further depicts the fingertip 408 in contact with the input surface 402, which in this example represents the touchpad 124. The fingertip 408 is applied to the input surface 402 to enable a user to manipulate the cursor 616 across the display device 122.

The movement of the animation 702 in proximity to the cursor 616 causes a corresponding haptic effect 704 to be output on the input surface 402 in the contact region where the fingertip 408 contacts the input surface 402. The amount of attractive force generated by the haptic effect 704 is characterized by a force graph 706. The force graph 706 includes a force axis 708, a proximity axis 710, and a force curve 712. The force axis 708 indicates an amount of attractive force and the proximity axis 710 indicates a proximity of the animation 702 to the cursor 616. The force curve 712 indicates an amount of attractive force generated between an input object and an input surface (which in this case is the fingertip 408 and the input surface 402, respectively) as the animation 702 moves across the display device 122. A point 714 on the proximity axis 710 represents a position where the animation 702 positionally coincides with the cursor 616 on the display device 122.

As indicated by the force curve 712, an amount of attractive force generated by the haptic effect 704 increases as the animation 702 moves from left to right on the display device 122, reaching a maximum force at the point 714, after which the attractive force decreases as the animation 702 continues to move rightward past the point 714. Thus, a proximity of the animation 702 to the cursor 616 affects an amount of force generated by the haptic effect 704.

Analogous to the scenario 600, the scenario 700 can be applied to other input objects, such as the pen 136. Further the scenario 700 can be applied to direct contact input to the display device 122. For instance, consider another implementation where the input surface 402 is the display device 122 and the fingertip 408 or other input object is placed in contact with the display device 122. In this implementation, the haptic effect 704 is output on the display device 122 and according to the force graph 706. Accordingly, a proximity of the animation to the fingertip 408 (or other input object) affects an amount of force utilized to generate the haptic effect 704. Among other things, this provides a tactile representation of the motion of the animation 702 across the display device 122.

While the scenario 700 is discussed with reference to movement of the animation 702 across the display device 122, it is to be appreciated that the scenario may additionally or alternatively be implemented to provide haptic effects to reflect different playback states of the animation. For instance, playing the animation 702 can cause the animation 702 to perform different movement types, such as rotation, translation, movement of individual parts of the animation 702, and so forth. Accordingly, the haptic effect 704 can be output to provide a haptic indication of these different movements.

Figure 8:
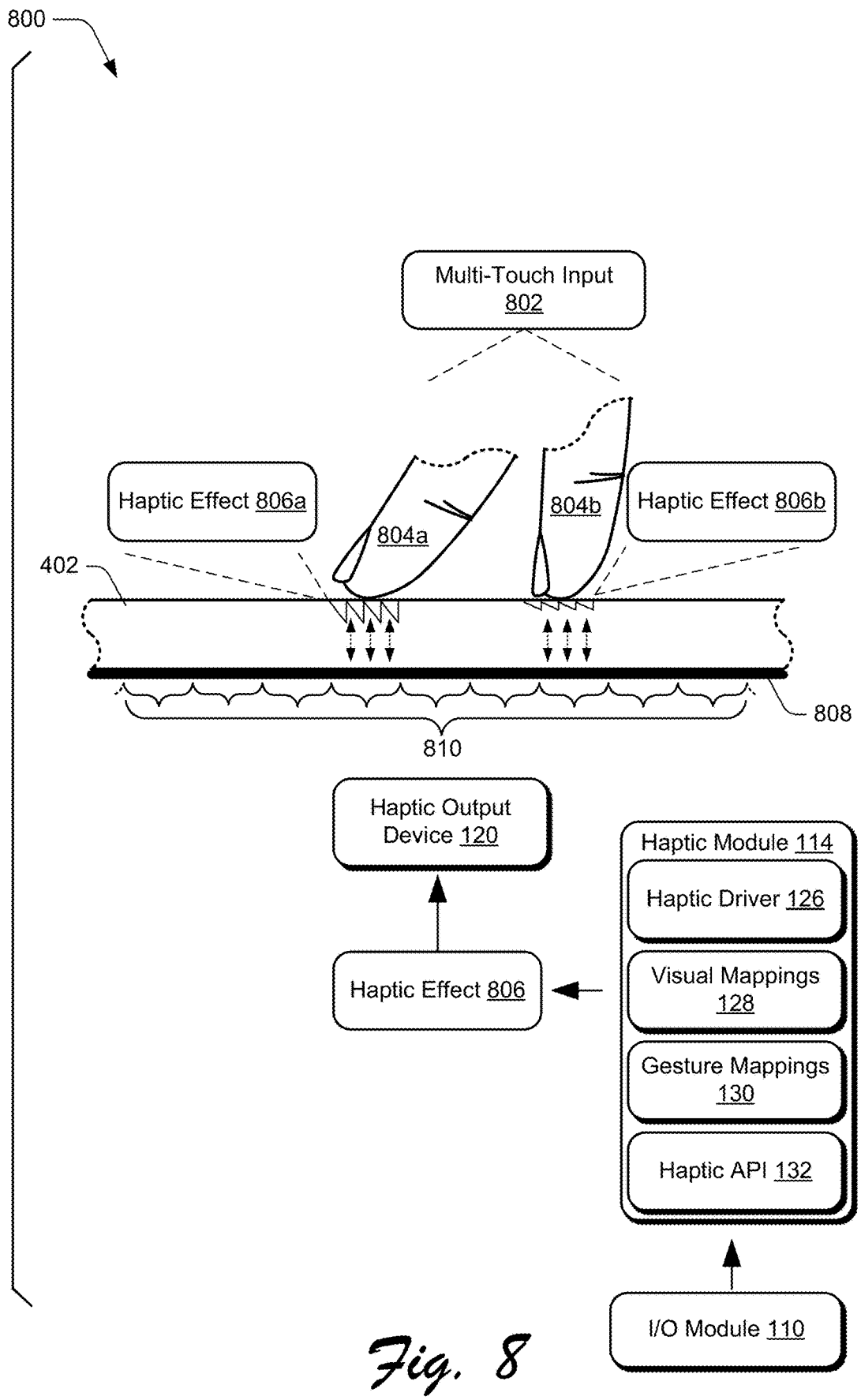
FIG. 8 depicts an implementation scenario for differential haptic effects on an input surface.

FIG. 8 depicts an implementation scenario 800 for differential haptic effects on an input surface. The scenario 800 includes the input surface 402, which can represent the touchpad 124 and/or the display device 122. In the scenario 800, a user applies a multi-touch input 802 to the input surface 402 and using a fingertip 804a and a fingertip 804b. The multi-touch input 802, for instance, represents a gesture that is used to invoke a specific command and/or action on the client device 102. The I/O module 110 recognizes the multi-touch gesture 802, and notifies the haptic module 114 of the multi-touch gesture 802. Accordingly, the haptic module 114 determines a haptic effect for the multi-touch gesture 802 by mapping the multi-touch gesture 802 to a corresponding haptic effect 806 in the gesture mappings 130. The haptic module 114 then instructs the haptic output device 120 to output the haptic effect 806 for the multi-touch gesture 802. In this particular example, the haptic effect 806 includes specific set of haptic effects.

Accordingly, and based on the haptic effect 806, the haptic output device 120 outputs a haptic effect 806a in the region where the fingertip 804a contacts the input surface 402, and a haptic effect 806b in the region where the fingertip 804b contacts the input surface 402. The haptic effect 806a is different than the haptic effect 806b in one or more ways. The haptic output device 120, for instance, generates the haptic effect 806a with more attractive force than the haptic effect 806b such that more surface friction is experienced at the fingertip 804a than at the fingertip 804b.

To enable such differential haptic effects to be generated, the haptic output device 120 is configured to apply different localized haptic effects across the input surface 402. The haptic output device 120, for instance, includes a conductive grid 808 that is positioned under the input surface 402 and that includes multiple individually controllable zones 810 that can be individually controlled to provide different haptic effects across the input surface 402. For example, the haptic output device 120 can apply a different voltage to each zone 810 to enable a different attractive force to be applied to each zone 810. Further, when one or more of the fingertips 804a, 804b slides across the input surface 402 as part of the multi-touch gesture 802, the haptic output device 120 can apply a consistent haptic effect to the moving fingertip(s).

For instance, consider that as part of the multi-touch gesture 802, the user slides the fingertip 804b across the input surface 402. The haptic output device 120 tracks the movement of the fingertip 804b and continues to apply the haptic effect 806b to the input surface 402 in the region where the fingertip 804b contacts the input surface 402 during the movement. Further, during movement of the fingertip 804b, the haptic output device 120 continues to apply the haptic effect 806a to the region where the fingertip 804a contacts the input surface 402. Alternatively, the haptic effect 806a and/or the haptic effect 806b can be modulated as the fingertip 804a and/or the fingertip 804b moves across the input surface 402.

While the scenario 800 is discussed with reference to input using two input objects (e.g., the fingertips 804a, 804b), it is to be appreciated that techniques described herein can be employed to generate differential haptic feedback for gestures with more than two input objects. Further, input objects other than a finger can be used, such as a pen or a stylus. A particular multi-touch gesture may also be applied using different types of input objects, such as a finger along with a pen as part of a single multi-touch gesture. In such an implementation, a different haptic effect can be applied to the pen than to the finger.

Figure 9:
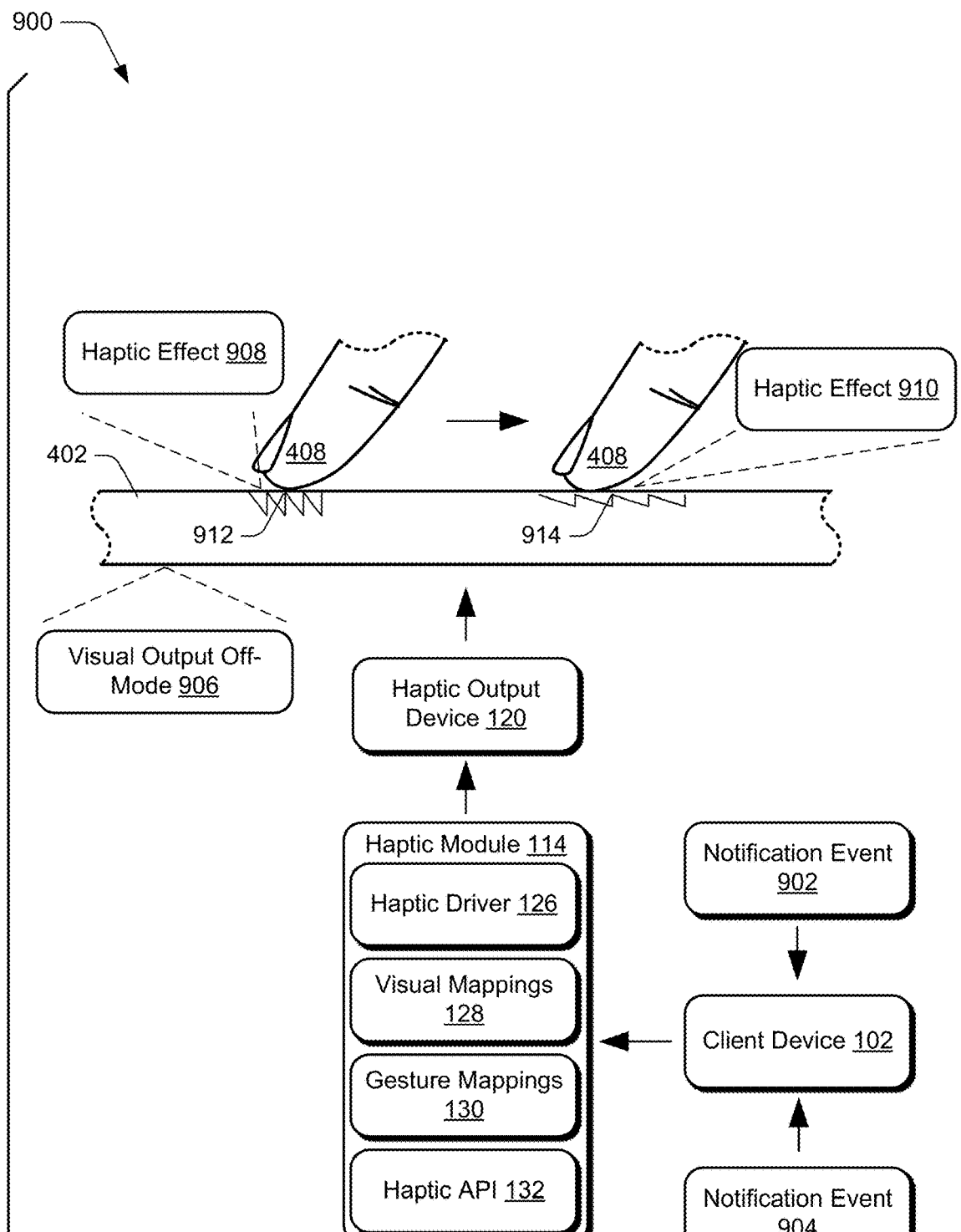
FIG. 9 depicts an implementation scenario for haptic effects when display functionality of a display is off.

FIG. 9 depicts an implementation scenario 900 for haptic effects when display functionality of a display is off. The scenario 900 includes the input surface 402, which for purposes of this scenario represents the display device 122.

In the scenario 900, the client device 102 receives a notification event 902 and a notification event 904. The notification events 902, 904 are representative of a number of different types of notification events, such as a notification of an incoming communication (e.g., a phone call, an email, an instant message, and so forth), a notification of a calendar event, a system notification, and so forth. In at least one implementation, the notification events 902, 904 are generated by instances of the applications 106 and/or the operating system 104.

Further, in the scenario 900, consider that display functionality of the display device 122 is in a visual output off-mode 906 (e.g., a sleep mode) such that the display device 122 is not illuminated and no graphics are displayed on the display device 122. The display device 122, for instance, goes into the visual output off-mode 906 before or after the notification events 902, 904 are received such that display functionality of the display device 122 is powered off.

While the display device 122 is in the visual output off-mode 906, the display device 122 is able to receive input and output haptic effects. For instance, while the display device 122 is in the visual output off-mode 906, a user provides touch input by swiping the fingertip 408 across the input surface 402 of the display device 122. The I/O module 110 detects the swipe gesture, and notifies the haptic output device 120 to output a haptic effect 908 and a haptic effect 910 on the input surface 402 to indicate the notification events 902, 904, respectively. Accordingly, the haptic output device 120 outputs the haptic effect 908 on the input surface 402 to indicate the notification event 902, and a haptic effect 910 to indicate the notification event 904. The haptic output device 120 outputs the haptic effects 908, 910 while the display device 122 is in the visual output off-mode 906 and in response to the swipe gesture. Thus, the haptic effects 908, 910 are detectable on the input surface 402 while the display device 122 is in the visual output off-mode 906.

In at least some implementations, the haptic effects 908, 910 are configured based on attributes of the notification events 902, 904. For instance, different types of notification events can be associated with different respective types of haptic effects such that a particular haptic effect profile identifies a corresponding notification event. If the notification event 902 is indicated as a higher priority notification event than the notification event 904, for example, the haptic effect 908 can be configured differently than a regular (non-high priority) notification event represented by the notification event 904. The haptic effect 908, for instance, can be generated with a higher attractive force than the haptic effect 910

Alternatively or additionally, locations on the input surface 402 where the haptic effects 908, 910 are output are indicative of the types of notification events. For instance, consider that the notification event 902 is from an application 106a, e.g., a calendar application. Further, consider that a region 912 of the input surface 402 is designated for generated haptic effects for the application 106a. Thus, a tactile indication that the notification 902 is from the application 106a is generated by outputting the haptic effect 908 at the region 912. Thus, different applications 106 can have different designated regions on the input surface 402 for providing haptic effects for their respective notifications.

As yet another example, consider that the notification event 904 is from a system utility, such as an indication of a low battery. The system utility can be assigned a region 914 on the input surface 402 for haptic effects, and thus the haptic effect 910 is output at the region 914.

By configuring different haptic effects for different notification events, users are provided with a tactile indication of a type of notification event without requiring a visual indication of the type. Consider, for instance, that the scenario 900 takes place in a setting where viewing the display device 122 is difficult or inappropriate, such as during a meeting or a social gathering. Without gazing at the display device 122, a user can touch the input surface 402 (e.g., with a swipe gesture) to detect the haptic effects 908, 910, and thus detect a tactile indication of the notification events 902, 904.

While the scenario 900 is discussed with reference to generating haptic effects on the display device 122, the scenario may also be applied for haptic effects on the touchpad 124. For instance, the haptic effects 908, 910 may alternatively or additionally be output on the touchpad 124 and based on the notifications 902, 904, respectively. Further, the haptic effects 908, 910 can be output on the touchpad 124 while the display device 122 is in the visual output off-mode 906.

Accordingly, the scenarios described above illustrate that implementations for haptic effect on a touch input surface described herein can be employed to provide haptic effects that are tailored to a variety of different environments and contexts. While these scenarios are discussed with reference to particular input objects and haptic effects, it is to be appreciated that techniques described herein can be employed utilizing any suitable input object and any suitable haptic effect.

Further, while the scenarios described above are discussed with reference to the touchpad 124 and/or the display device 122, it is to be appreciated that the scenarios may be implemented with any haptic-enabled device.

Having discussed some example implementation scenarios, consider now a discussion of some example procedures in accordance with one or more embodiments.

Example Procedures

The following discussion describes some example procedures for haptic effect on a touch input surface in accordance with one or more embodiments. The example procedures may be employed in the environment 100 of FIG. 1, the system 1200 of FIG. 12, and/or any other suitable environment. The procedures, for instance, represent example procedures for implementing the implementation scenarios described above. In at least some implementations, the steps described for the various procedures are implemented automatically and independent of user interaction.

Figure 10:
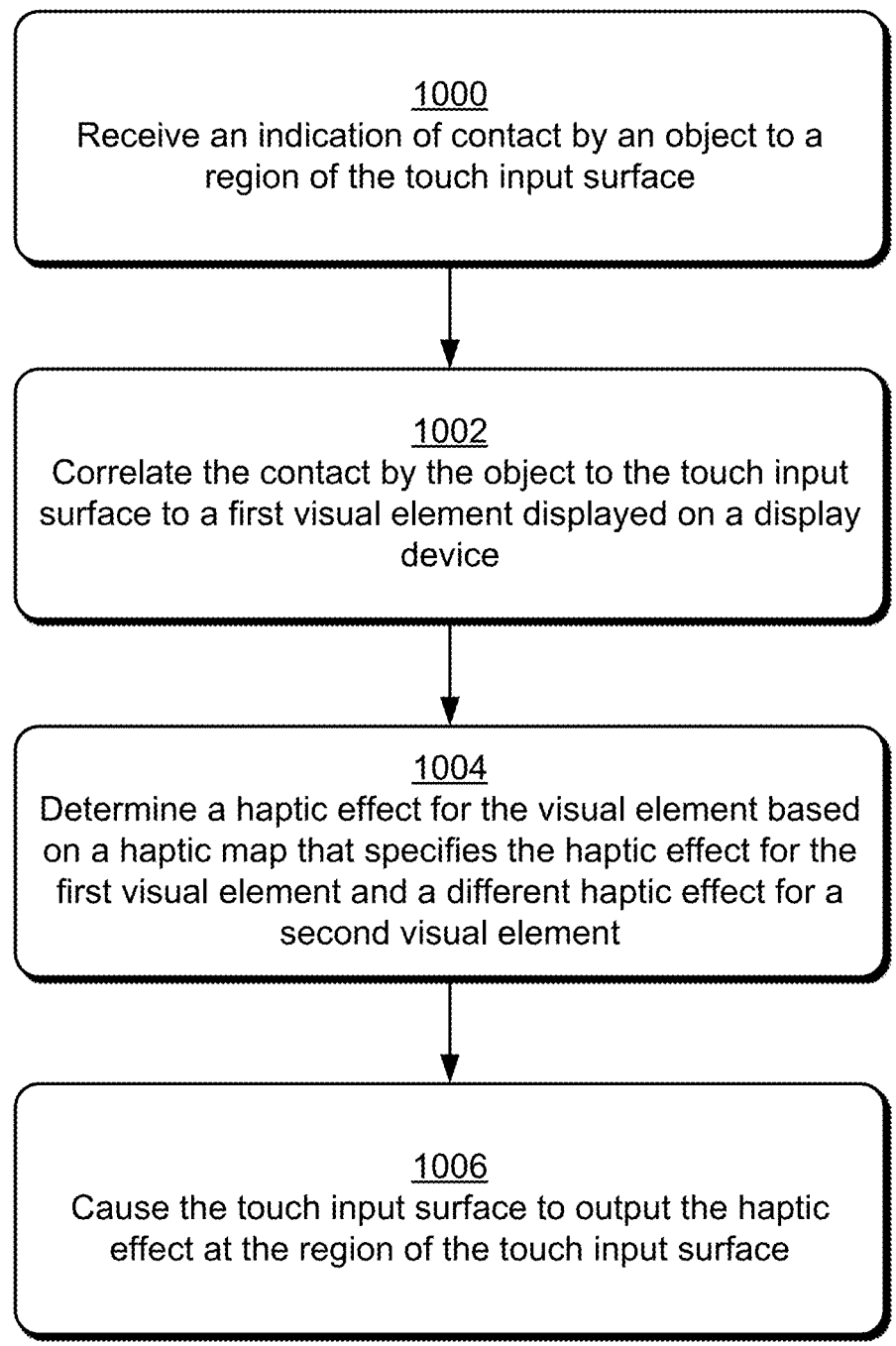
FIG. 10 is a flow diagram that describes steps in a method for causing a haptic effect to be output based on interaction with a visual element.

FIG. 10 is a flow diagram that describes steps in a method in accordance with one or more implementations. The method describes an example procedure for causing a haptic effect to be output based on interaction with a visual element. In at least some implementations, the method may be performed at least in part by the haptic module 114 and/or by the operating system 104.

Step 1000 receives an indication of contact by an object to a region of the touch input surface. Generally, the object represents an instance of various types of objects that can be used to provide input, such as a finger, a pen, a stylus, and so forth. Further, the touch input surface can be implemented in various ways, such as a trackpad, a touchscreen of a display device, and/or other touch sensitive surface that can be leveraged to detect touch interaction.

Step 1002 correlates the contact by the object to the touch input surface to a first visual element displayed on a display device. In at least one implementation, the contact by the object represents an interaction by the object with a trackpad to cause a corresponding interaction with the first visual element, such as to move a visual indicator (e.g., a cursor) relative to the first visual element.

In another implementation, the touch input surface is part of the display device itself, and thus the movement of the object occurs on the display device. A user, for instance, uses their finger or other object to interact with the first visual element on the display device.

Step 1004 determines a haptic effect for the visual element based on a haptic map that specifies the haptic effect for the first visual element and a different haptic effect for a second visual element. For instance, and as detailed above, the haptic module 114 maintains the visual mappings 128 that can be leveraged to determine haptic effects to be applied for different visual elements. Further, the visual mappings 128 can be leveraged to generate a haptic map for a particular visual environment, such as described with reference to the scenarios 200, 500.

Step 1006 causes the touch input surface to output the haptic effect at the region of the touch input surface. The haptic module 114, for instance, leverages the haptic driver 126 to cause a haptic output device 120 to output the haptic effect. In at least one implementation, the haptic module 114 specifies data that describes attributes of the haptic effect, such as duration and intensity (e.g., an amount of attractive force) for the haptic effect. Further, the haptic effect can be varied while the contact by the object to the touch input surface occurs. For instance, an amount of attractive force generated for the haptic effect can be modulated over the course of the contact by the object with the touch input surface. In at least one implementation, this simulates variable frictional force between the object and the touch input surface.

Figure 11:
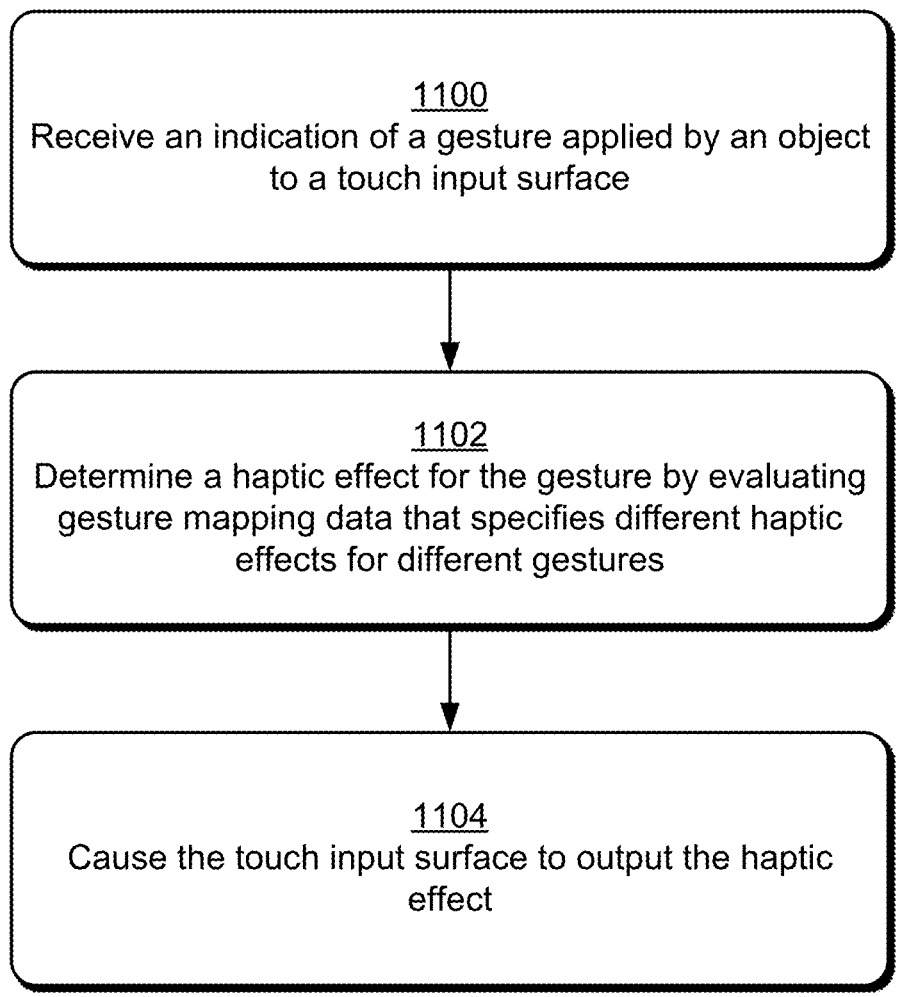
FIG. 11 is a flow diagram that describes steps in a method for causing a haptic effect to be output for a gesture.

FIG. 11 is a flow diagram that describes steps in a method in accordance with one or more implementations. The method describes an example procedure for causing a haptic effect to be output for a gesture. In at least some implementations, the method may be performed at least in part by the haptic module 114 and/or by the operating system 104.

Step 1100 receives an indication of a gesture applied by an object to a touch input surface. The I/O module 110, for instance, detects that a gesture is applied to a touch input device 116, such as the touchpad 124 and/or the display device 122. The I/O module 110 can also determine attributes of the gesture, such as a number of objects (e.g., fingers) used to apply the gesture, a direction of the gesture relative to the touch input surface, a velocity of the gesture, and so forth. In an implementation where the gesture involves multiple objects, the attributes of the gesture can include direction and/or velocity of movement of a first object relative to a second object used to generate the gesture.

Step 1102 determines a haptic effect for the gesture by evaluating gesture mapping data that specifies different haptic effects for different gestures. The haptic module 114, for instance, includes logic (e.g., the gesture mappings 130) that is executed by the client device 102 to identify a particular haptic effect that is to be output for the gesture.

Step 1104 causes the touch input surface to output the haptic effect. The haptic module 114, for instance, leverages the haptic driver 126 to cause a haptic output device 120 to output the haptic effect and based on parameters for the haptic effect, such as duration and intensity specified by the gesture mappings for the haptic effect.

In an implementation where the gesture involves multiple objects, the haptic effect may include different haptic effects for the multiple objects. For instance, where the gesture represents a multi-touch gesture applied using multiple fingers, an attribute of a haptic effect output at a contact point for a first finger can be different than an attribute of a haptic effect output at a contact point for a second finger.

In an implementation where the gesture involves movement of the object on the touch input surface, the haptic effect can be output on the touch input surface and while the object moves on the touch input surface to provide a consistent haptic output to the object during the object movement. The I/O module 110, for instance, tracks location information for the object as the object moves during the gesture. The I/O module 110 provides this location information to the haptic module 114, which uses the location information to provide localized haptic output of the haptic effect at a point of contact between the object and the touch input surface and while the object is in motion.

Alternatively or additionally, the haptic effect can be varied to generate varying haptic output while the object moves during the gesture. For instance, varying haptic output can be utilized during a motion gesture to provide a haptic indication of a particular predefined gesture pattern.

In at least one implementation, the haptic effect can be output while a display device is in a visual output off-mode. For instance, in a scenario where the touch input surface is the display device 122, the haptic effect can be output via the display device 122 when a user applies the gesture to the display device, and while visual output of the display device 122 is off. This scenario can also be applied where the touch input surface is the touchpad 124 and the display device 122 is in a visual output off-mode. For instance, while the display device 122 is in the visual output off-mode, a user can apply the gesture to the touchpad 124 and the haptic effect can be output on the touchpad 124. In at least one implementation, the haptic effect can be output to indicate a particular type of notification event that occurs on the client device 102.

Accordingly, techniques discussed herein enable haptic effects to be provided in a wide variety of different scenarios.

Having discussed some example procedures, consider now a discussion of an example system and device in accordance with one or more embodiments.

Example System and Device

Figure 12:
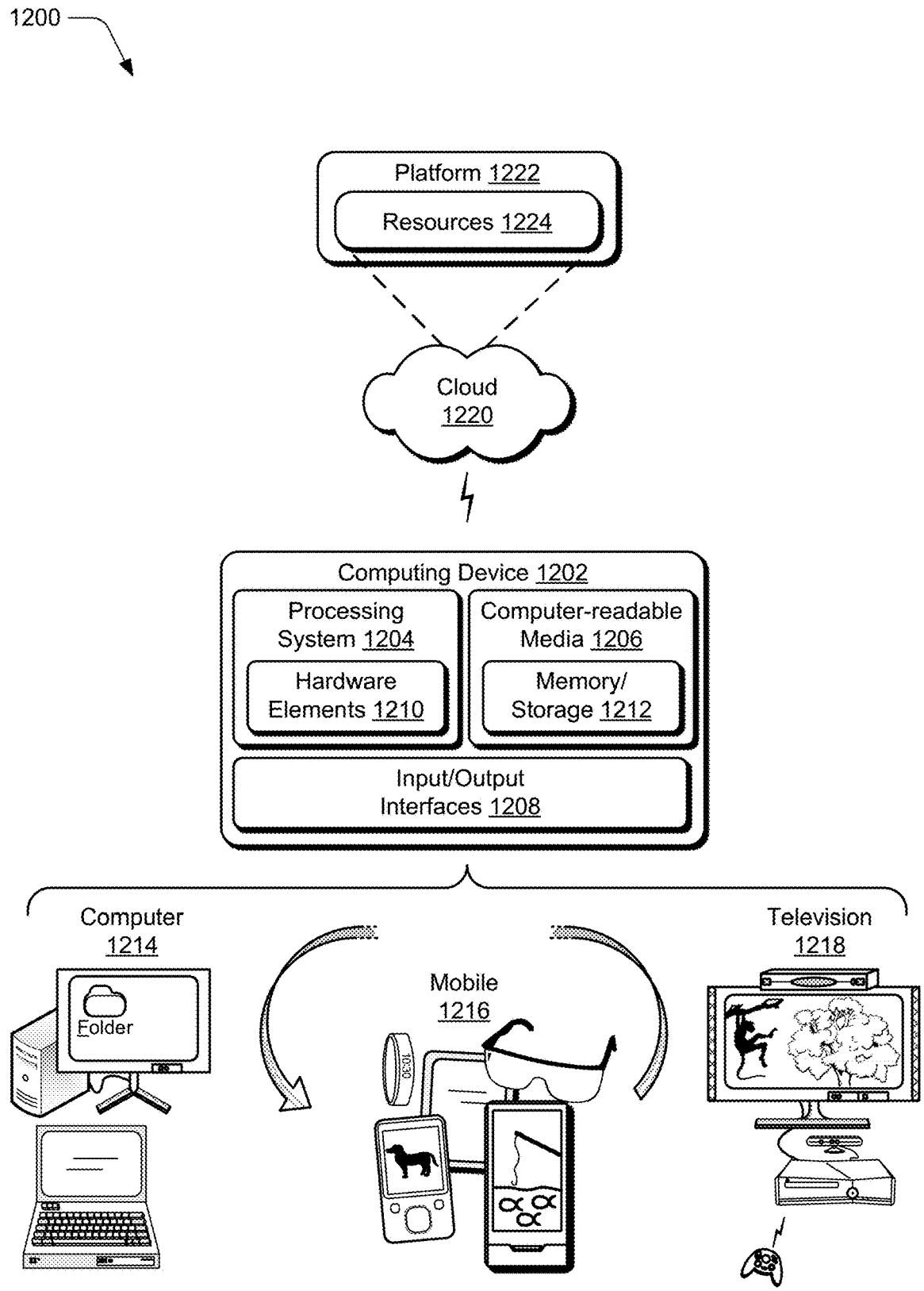
FIG. 12 illustrates an example system and computing device as described with reference to FIG. 1, which are configured to implement embodiments of techniques described herein.

FIG. 12 illustrates an example system generally at 1200 that includes an example computing device 1202 that is representative of one or more computing systems and/or devices that may implement various techniques described herein. For example, the client device 102 discussed above with reference to FIG. 1 can be embodied as the computing device 1202. The computing device 1202 may be, for example, a server of a service provider, a device associated with the client (e.g., a client device), an on-chip system, and/or any other suitable computing device or computing system.

The example computing device 1202 as illustrated includes a processing system 1204, one or more computer-readable media 1206, and one or more Input/Output (I/O) Interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1210 and computer-readable media 1206 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of modules that are executable by the computing device 1202 as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a wearable device, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. For example, functionalities discussed with reference to the haptic module 114 may be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. The steps described in the methods, for instance, represent logic executed by a processor to perform the various actions described by the steps and their associated details. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for determining a haptic effect for a visual element based on a haptic map, the system including: a touch input surface; at least one processor; and one or more computer-readable storage media including instructions stored thereon that, responsive to execution by the at least one processor, cause the system perform operations including: receiving an indication of contact by an object to a region of the touch input surface; correlating the contact by the object to the touch input surface to a first visual element displayed on a display device; determining a haptic effect for the visual element based on a haptic map that specifies the haptic effect for the first visual element and a different haptic effect for a second visual element; and causing the touch input surface to output the haptic effect at the region of the touch input surface.

In addition to any of the above described systems, any one or combination of: wherein the touch input surface includes a trackpad separate from the display device; wherein the touch input surface includes the display device; wherein the touch input surface includes a trackpad separate from the display device, and wherein said correlating the contact by the object to the first visual element includes an indication that contact by the object with the trackpad causes of a manipulation of a visual indicator at least partially over the first visual element on the display device; wherein the touch input surface includes the display device, and wherein said correlating the contact by the object to the first visual element includes an indication of touch input to the first visual element on the display device; wherein the haptic map is generated based on a haptic tree that specifies different haptic effects for different visual elements, and wherein said determining the haptic effect includes correlating a visual tree that includes the first visual element to the haptic tree that includes the haptic effect and the different haptic effect; wherein the contact by the object to the touch input surface causes a movement of a visual indicator over the first visual element, and wherein the haptic effect is modulated as the visual indicator moves over the first visual element; wherein the contact by the object to the touch input surface includes movement of the object over the first visual element on the display device, and wherein the haptic effect is modulated as the object moves over the first visual element; wherein the haptic effect includes a variable attractive force generated between the touch input surface and the object, and wherein said causing the touch input surface to output the haptic effect includes varying the attractive force as the object moves across the touch input surface; wherein the first visual element includes an animation that plays on the display device, and wherein said causing the touch input surface to output the haptic effect includes modulating the haptic effect as the animation plays on the display device.

A computer-implemented method for determining a haptic effect for a gesture, the method including: receiving an indication of a gesture applied by an object to a touch input surface; determining, by a computing system, a haptic effect for the gesture by evaluating gesture mapping data that specifies different haptic effects for different gestures; and causing the touch input surface to output the haptic effect.

In addition to any of the above described methods, any one or combination of: wherein the gesture includes the object and a different object applied to the touch input surface, and wherein the haptic effect includes a first haptic effect output at a region where the object contacts the input surface, and a different haptic effect output at a region where the different object contacts the input surface; wherein the touch input surface includes a trackpad, and wherein the gesture includes an interaction with a visual element displayed on a display device that is separate from the trackpad; wherein the touch input surface includes a display device that is in a visual output off-mode, and wherein said causing the touch input surface to output the haptic effect includes causing the display device to output the haptic effect while the display device is in the visual output disabled mode; wherein the touch input surface includes a display device that is in a visual output off-mode, the haptic effect is determining based on a notification event that occurs on the computing system, and wherein said causing the touch input surface to output the haptic effect includes causing the display device to output the haptic effect while the display device is in the visual output disabled mode.

A system for mapping haptic effects for visual elements and gestures, the system including: at least one processor; and one or more computer-readable storage media including instructions stored thereon that, responsive to execution by the at least one processor, implement functionalities including: visual mappings that specify different haptic effects to be applied for different visual elements; gesture mappings that specify different haptic effects to be applied for different gestures; and a haptic module configured to: receive an indication of an interaction with a visual element via an input surface, and cause a haptic effect identified by the visual mappings for the visual element to be output on the input surface; and receive an indication of a gesture applied to the input surface, and cause a haptic effect identified by the gesture mappings for the gesture to be output on the input surface.

In addition to any of the above described systems, any one or combination of: wherein the visual mappings specify, for a particular visual element, a particular haptic effect for the particular visual element based on one or more of a visual attribute or a functional attribute of the particular visual element; wherein the gesture mappings specify, for a particular gesture, a particular haptic effect for the particular gesture based a number of input objects used to apply the gesture; wherein the haptic effect identified for the gesture includes varying haptic effects based on an indication of progress of the gesture; wherein the interaction with the visual element includes a movement of an object relative to the visual element, and wherein the haptic effect includes a varying haptic output as the object moves relative to the visual element.

Conclusion

Techniques for haptic effect on a touch input surface are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
a touch input surface;
at least one processor; and
one or more computer-readable storage media including instructions stored thereon that, responsive to execution by the at least one processor, cause the system perform operations including:
receiving an indication of contact by an object to a region of the touch input surface;
correlating the contact by the object to the touch input surface to attributes of a visual element displayed on a display device;
determining a haptic effect for the visual element based on an evaluation of a haptic map that specifies different haptic effects applicable to the visual element and attributes associated with the different haptic effects, wherein the determining comprises selecting, from the different types of haptic effects, the haptic effect for the visual element based on a correlation of the attributes of the visual element with at least one attribute of the attributes associated with the different haptic effects; and
causing the touch input surface to output the haptic effect at the region of the touch input surface.

2. A system as recited in claim 1, wherein the touch input surface comprises a trackpad separate from the display device.

3. A system as recited in claim 1, wherein the touch input surface comprises the display device.

4. A system as recited in claim 1, wherein the touch input surface comprises the display device, and wherein said correlating the contact by the object to the visual element comprises an indication of touch input to the visual element on the display device.

5. A system as recited in claim 1, wherein the haptic map comprises a haptic tree that specifies different types and attributes of the different haptic effects that are applicable for the visual element, and wherein said determining the haptic effect comprises utilizing the types and attributes of the haptic tree to select the haptic effect.

6. A system as recited in claim 1, wherein the contact by the object to the touch input surface causes a movement of a visual indicator over the visual element, and wherein the haptic effect is modulated as the visual indicator moves over the visual element.

7. A system as recited in claim 1, wherein the contact by the object to the touch input surface comprises movement of the object over the visual element on the display device, and wherein the haptic effect is modulated as the object moves over the visual element.

8. A system as recited in claim 1, wherein the haptic effect comprises a variable attractive force generated between the touch input surface and the object, and wherein said causing the touch input surface to output the haptic effect comprises varying the attractive force as the object moves across the touch input surface.

9. A system as recited in claim 1, wherein the visual element comprises an animation that plays on the display device, and wherein said causing the touch input surface to output the haptic effect comprises modulating the haptic effect as the animation plays on the display device.

10. A system as recited in claim 1, wherein the correlating comprises evaluating, when a receipt of the contact interacts with the visual element, a haptic profile for the visual element that specifies attributes of the visual element which are modifiable based on an interaction with the visual element, and wherein the determining of the haptic effect cross-references the haptic profile with the haptic map to select the haptic effect.

11. A computer-implemented method, comprising:
receiving an indication of a gesture applied by an object to a touch input surface;
correlating a contact of the touch input surface with attributes of a visual element displayed in a graphical user interface;

determining, by a computing system, a haptic effect for the gesture by evaluating gesture mapping data that specifies different haptic effects applicable to the visual element and attributes associated with the different haptic effects, wherein the determining comprises selecting, using the haptic mapping data, the haptic effect, from the different haptic effects, based on a correlation of the attributes of the visual element with at least one attribute of the attributes associated with the different haptic effects; and causing the touch input surface to output the haptic effect.

12. A method as described in claim 11, wherein the gesture includes the object and a different object applied to the touch input surface, and wherein the haptic effect includes a first haptic effect output at a region where the object contacts the input surface, and a different haptic effect output at a region where the different object contacts the input surface.

13. A method as described in claim 11, wherein the touch input surface comprises a trackpad, and wherein the gesture comprises an interaction with the visual element displayed on a display device that is separate from the trackpad.

14. A method as described in claim 11, wherein the touch input surface comprises a display device that is in a visual output disabled mode, and wherein said causing the touch input surface to output the haptic effect comprises causing the display device to output the haptic effect while the display device is in the visual output disabled mode.

15. A method as described in claim 11, wherein the touch input surface comprises a display device that is in a visual output disabled mode, and wherein said causing the touch input surface to output the haptic effect comprises causing the display device to output a notification event associated with the haptic effect while the display device is in the visual output disabled mode.

16. A system comprising:
at least one processor; and
one or more computer-readable storage media including instructions stored thereon that, responsive to execution by the at least one processor, implement functionalities including:
visual mappings that specify different haptic effects to be applied for different visual elements, wherein the visual mappings comprise a haptic profile that specifies attributes of a visual element that are modifiable based on an interaction with the visual element;
gesture mappings that specify different haptic effects to be applied for different gestures, wherein the gesture mappings comprise a haptic map that specifies different types of haptic effects applicable to the visual element; and
a haptic module configured to:
receive an indication of an interaction with the visual element via an input surface,
select a haptic effect for output based on a correlation of the haptic profile with the haptic map,
cause a selected haptic effect to be output on the input surface, and
receive an indication of a gesture applied to the input surface, and cause a haptic effect identified by the gesture mappings for the gesture to be output on the input surface.

17. A system as recited in claim 16, wherein the haptic profile specifies visual attributes or functional attributes of the visual element.

18. A system as recited in claim 16, wherein the gesture mappings specify, for a particular gesture, a particular haptic effect for the particular gesture based a number of input objects used to apply the gesture.

19. A system as recited in claim 16, wherein the haptic effect identified for the gesture comprises varying haptic effects based on an indication of progress of the gesture.

20. A system as recited in claim 16, wherein the interaction with the visual element comprises a movement of an object relative to the visual element, and wherein the haptic effect comprises a varying haptic output as the object moves relative to the visual element.

* * * * *